United States Patent Office 2,794,007
Patented May 28, 1957

2,794,007
BENEFICIATED CHEMICALLY CURING POLY-EPOXY ETHER RESINOUS COMPOSITION

Robert S. Taylor, Oak Lawn, Ill., assignor to The Sherwin-Williams Company, Cleveland, Ohio, a corporation of Ohio No Drawing. Application August 15, 1952,
Serial No. 304,649

6 Claims. (Cl. 260—18)

This invention relates as indicated to a new and improved chemically curing resinous composition and more particularly to coating compositions of the ether resin type which have improved hardened film characteristics.

Many of the chemically hardening ether type resinous materials, and especially the polyepoxide type resins, when cast as films of varying thickness and having the hardening agent in admixture therewith exhibit spotting and crawling during or ofter solvent vaporation. As is well known, most of these resins do not cure spontaneously and even on exposure to air for prolonged periods will remain in a fluid or semi-fluid condition in the absence of a cross linking or curing agent. Thus these materials may be considered as internally hardened resins as opposed to externally hardened resins which dry by evaporation of solvent and/or polymerization due to the effect of an oxygen-containing gas thereon, e. g., drying oils.

The attraction of the molecular structure of the resin for its like kind is believed to be sufficiently greater than that of the surface on which it is cast to form films which would seem to account for the strange behavior. Cratering and/or crawling producing force, or cohesive force, therefore, appear to be greater than the adhesive forces tending to cause the film to level out and become evenly distributed.

(A)

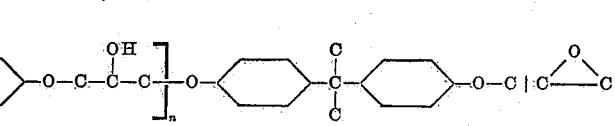

It is a primary object of this invention, therefore, to provide an ether resin-containing composition which is characterized by substantial freedom from spotting or cratering and crawling.

Another characteristic of the ether resins is that pigments dispersed therein have a strong tendency to float or flood causing random areas where the film color appears darker than that of the surrounding areas. Although surface and attractive forces are believed to be partly responsible for flooding, poor wetting of the pigment by the resin is usually considered a major factor in pigment flooding problems. The normal manner of obviating this difficulty in the usual paint vehicles is by the use of a surface active agent which operates either to increase or decrease the surface tension of the liquid medium as may be required for individual pigments to effect a desired result of a smooth, even pigment concentration.

It is another object of this invention, therefore, to provide an ether resin-containing composition which has improved characteristics for pigment dispersion, but without employing materials normally considered as surface active agents.

Other objects will appear as the description proceeds.

To the accomplishment of the foregoing and related ends, said invention, then consists of the means hereinafter fully described and particularly pointed out in the appended claims, the following description seting forth in detail certain illustrative embodiments of the invention, such disclosed means constituting, however, but a few of the various forms in which the principle of this invention may be employed.

Broadly stated, this invention comprises the provision of an improved ether resin-containing coating vehicle which is characterized by substantial freedom from crawling, cratering, and/or spotting comprising a major amount of an ether resin and a minor amount sufficient to inhibit crawling and cratering and/or spotting during the hardening of the resinous film of an aliphatic, non-ionic, organic compound selected from the group consisting of liquid and solid petroleum hydrocarbons containing an average of from about 24 to about 32 carbon atoms, saturated aliphatic ethers containing from about 24 to about 36 carbon atoms, tri-esters of saturated and mono-unsaturated aliphatic straight chain carboxylic acids containing from 16 to 20 carbon atoms with glycerine, diesters of saturated and mono-unsaturated aliphatic straight chain carboxylic acids containing from 16 to 20 carbon atoms with glycol, lanolin, hydrogenated castor oil and mixtures of the foregoing.

The term "ether resin" as used herein and in the appended claims is intended to include the relatively recent available class of resinous materials characterized by the presence therein of a plurality of ether groups and a plurality of functional groups reactive with acids, i. e., hmydroxyl and/or epoxy groups. Among the most important members of this class are the polyepoxides which contain two or more epoxide groups

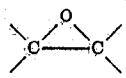

per molecule. A general formula for certain of these polyepoxides (omitting aliphatic and aromatic hydrogen atoms) is as follows:

where $n$ is at least 1.

These resins have somewhat different characteristics depending upon the value of $n$ but all of them demonstrate to an unsatisfactory degree the cratering or crawling and pigment spotting defects above referred to. In certain instances these resins will be found to be admixed with an aliphatic epoxide made, for example, from epichlorohydrin and various polyhydric alcohols, e. g., glycerol, pentaerythritol, other polyols, or mixtures thereof. Although the actual product is probably a complex mixture the ideal product made from glycerine and epichlorohydrin may be represented by the formula:

(B)

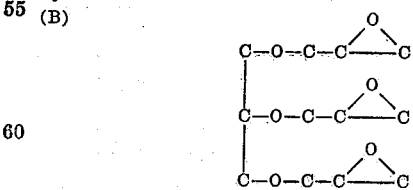

The class of products of which compound "B" above is representative may be formulated as

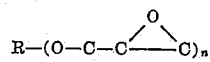

wherein R is the residue of an aliphatic polyhydric alcohol and $n$ is an integer, at least 3 and up to and including 6.

For other examples of ether resins usefully compounded in accordance with this invention, reference may be had to the following patents: Arvin, 2,060,715; Nelson, 2,594,979; Greenlee, 2,592,560, 2,582,985, 2,558,949, 2,456,408; Newey, 2,575,558; Bradley, 2,541,027; Wiles et al., 2,528,932; etc., wherein will be found adequate directions for the preparation and curing of various types of ether resins. The examples and disclosures in these patents need not be re-produced here, but will serve, nevertheless to illustrate specific examples of materials contemplated by the term "ether resins." Satisfactory results have been obtained, however, with ether resins of the type represented by Formula A given above alone or in combination with materials of the type represented by Formula B above.

Regarding the curing of these resins, in the foregoing patents numerous curing agents are disclosed together with the ranges which have been found effective to yield the desired results of each of the various types of curing agents which may be employed. Normally and preferably, these curing agents are of a polyfunctional type capable, therefore, of cross linking between adjacent molecules of the ether resin. A preferred and highly satisfactory class of curing agents for these purposes are the aliphatic polyamines such as ethylene diamine, triethylene tetramine, tetramethylene diamine, and the like. The preferred class of curing agents for use in accordance with this invention may be represented by the general formula $$NH_2-(R)_n-NH_2$$

wherein R is a methylene radical and $n$ is at least 1. In general, the amino compounds are used in amounts ranging from about 4% to about 15% based on the weight of the ether resin being cured calculated as 100% solids. These materials may be used in aqueous solutions, ethylene diamine, for example, being effective as an approximately 80% aqueous solution.

It becomes convenient at this point to illustrate the third essential component of this invention by giving specific examples of materials which have been found useful as addition agents in ether resin-containing compositions for the purpose of preventing crawling or cratering and/or pigment spotting. It should be pointed out, however, that the materials useful for this purpose appear to be somewhat selective and with a few exceptions, broad generic classes of materials cannot be categorically labelled as useful in accordance with this invention. As a general rule, useful addition agents for these purposes contain at least 23–24 carbon atoms, are uusally aliphatic, are preferably saturated and may be no more than mono-unsaturated, and finally are non-ionic.

One of the more generally operative classes in accordance with this invention include the liquid and solid petroleum hydrocarbons containing from about 24 to about 32 carbon atoms, such as, for example, crude paraffin wax and refined mineral oils, e. g., SAE10, SAE20, SAE30, SAE50, motor oils substantially free of additive materials and purified or synthesized hydrocarbons of the straight chain saturated aliphatic type containing from about 24 to about 32 carbon atoms.

Another class of materials which is operative for the purposes of this invention in substantially the same way is the group of saturated aliphatic ethers which contain from about 24 to about 36 carbon atoms such as, for example, dilauryl ether, dicetyl ether and dioctadecyl ether.

Another group of materials which has been found useful in substantially the same way as those previously mentioned are certain esters of polyhydric alcohols, particularly glycerine and ethylene glycol. The glycerine and glycol full esters of saturated and mono-unsaturated aliphatic straight chain carboxylic acids containing from 16 to 20 carbon atoms are particularly useful. Examples of such esters include glyceryl tristearate, glyceryl trioleate, glyceryl tripalmitate, glycol distearate, glycol dioleate, and glycol dipalmitate. Another ester which is particularly useful in accordance with this invention is lanolin which appears to be chiefly composed of cholesteryl and iso-cholesteryl esters of higher fatty acids such as stearic acid and palmitic acid. Still another glyceride ester which has been found useful in accordance with this invention is hydrogenated castor oil. This material consists chiefly of glyceryl tri-(hydroxy stearate).

The following specific examples illustrate compositions which showed improvement in the cratering or crawling and/or spotting characteristics over the compositions which contained the same ingredients with the exception that no addition agent as herein specified was included in the composition.

*Example I*

| | Parts |
|---|---|
| Ether resin M | 47.5 |
| Triethylene tetramine | 2.5 |
| Methyl isobutyl ketone | 28.0 |
| Crude Paraffin wax | 0.5 |

*Example II*

| | Parts |
|---|---|
| Ether resin M | 47.5 |
| Triethylene tetramine | 2.5 |
| Benzyl alcohol | 10.0 |
| Toluol | 16.0 |
| Methyl isobutyl ketone | 16.0 |
| Lanolin | 0.8 |

*Example III*

| | Parts |
|---|---|
| Ether resin N | 50.0 |
| Triethylene tetramine | 3.0 |
| Toluol | 15.0 |
| Methyl isobutyl ketone | 15.0 |
| Crude Paraffin wax | 0.4 |

*Example IV*

| | Parts |
|---|---|
| Ether resin N | 50.0 |
| Triethylene tetramine | 3.0 |
| Toluol | 15.0 |
| Methyl isobutyl ketone | 15.0 |
| Hydrogenated castor oil | 0.1 |

*Example V*

| | Parts |
|---|---|
| Ether resin N | 50.0 |
| Triethylene tetramine | 3.0 |
| Butyl ether | 5.0 |
| Toluol | 15.0 |
| Methyl isobutyl ketone | 15.0 |
| Dicetyl ether | 0.1 |

*Example VI*

| | Parts |
|---|---|
| Ether resin M | 47.5 |
| Triethylene tetramine | 2.5 |
| Toluol | 29.0 |
| Methyl isobutyl ketone | 29.0 |
| SAE 20 motor oil | 0.5 |

*Example VII*

| | Parts |
|---|---|
| Ether resin Q | 50.0 |
| Ethylene diamine | 2.5 |
| Hydrogenated castor oil | 0.1 |

*Example VIII*

| | Parts |
|---|---|
| Ether resin Q | 50.0 |
| Triethylene tetramine | 3.0 |
| Crude paraffin wax | 2.5 |

Example IX

| | Parts |
|---|---|
| Ether resin M | 50.0 |
| Benzyl alcohol | 12.5 |
| Butyl alcohol | 12.5 |
| Methyl isobutyl ketone | 12.5 |
| High flash naphtha (1257) | 12.5 |
| Hydrogenated castor oil | 0.09 |
| Crude paraffin | 0.02 |
| Triethylene tetramine | 3.5 |

It will be seen from the foregoing examples that these materials appear to be useful in the compositions whether a solvent is present or not. Moreover, when the foregoing vehicles are pigmented with normal amounts of the usual pigments as by grinding, there is a great improvement in the pigment spotting characteristics of the final film. So far as pigment spotting is concerned, it is believed that cratering or crawling which is observed in the dried films in the absence of the addition agents of this invention gives rise to spotting when a pigment is present. Cratering or crawling are properties of the dried film of the untreated resin whether pigment is present or not, but spotting appears in the untreated films when a pigment is employed.

Among the various pigments which may be incorporated in the resinous coating compositions there may be mentioned, for example, carbon black, iron oxide, titanium dioxide, lithopone, zinc chromate, lead chromate, copper phthalocyanine, red iron oxide, and the like.

In general, the addition agents of this invention may be used in concentrations based on the weight of the ether resin being cured, calculated as 100% non-volatile material ranging from about 0.2% to about 7%. It is advantageous, in certain instances, to use a mixture of addition agents depending upon the resin employed and the type of surface desired. Example IX is illustrative of the use of such a mixture.

Ether resin M referred to in the foregoing examples is a novel ether resin, the invention of another individual, produced by reacting di-(parahydroxyphenyl) dimethyl methane with butyraldehyde to form a phenol-aldehyde condensation product and subsequently reacting the condensation product with an epihalohydrin such as epichlorohydrin. Ether resin N in the foregoing examples is a mixture of polyepoxides having formulas corresponding to Formulas A and B referred to above. Ether resin Q is a resin having a general formula corresponding to the general Formula A given above.

These compositions when blended in accordance with the foregoing specific examples tend to harden rather quickly at elevated temperatures and accordingly must be applied within a reasonable period of time following addition of the curing agent to the ether resin. With the more reactive curing agents such as ethylene diamine, a "pot life" in the presence of the ether resin of about 1 hour is available unless certain materials which are capable of inhibiting the action of the hardening agent at normal temperatures are included.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. An improved chemically hardening polyepoxy ether resin containing coating vehicle which is characterized by substantial freedom from crawling and cratering, and spotting of pigments contained therein, comprising a major amount of a chemically hardening polyepoxy ether resin and a minor amount, sufficient to inhibit crawling and cratering, and spotting during the hardening of the resinous film, of an aliphatic, non-ionic organic compound selected from the group consisting of liquid and solid petroleum hydrocarbons containing an average of from about 24 to about 32 carbon atoms, saturated aliphatic mono-ethers containing from about 24 to about 36 carbon atoms, tri-esters of saturated and mono-unsaturated aliphatic straight chain carboxylic acids containing from 16 to 20 carbon atoms with glycerine, di-esters of saturated and mono-unsaturated aliphatic straight chain carboxylic acids containing from 16 to 20 carbon atoms with glycol, lanolin, and mixtures of the foregoing.

2. A composition in accordance with claim 1 in which the chemically hardening polyepoxy ether resin is a mixed polyepoxide comprising materials having the formulas, omitting hydrogen atoms:

(A)
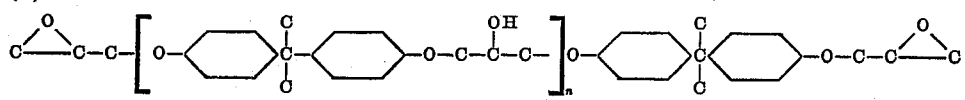

wherein n is at least 1, and (B)
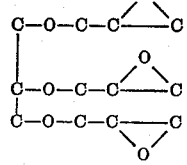

3. A composition in accordance with claim 1 in which the chemically hardening polyepoxy ether resin is produced from the condensation product of di-(para hydroxy phenyl) dimethyl methane and butyraldehyde reacted with an epihalohydrin.

4. A composition in accordance with claim 1 in which the aliphatic, non-ionic, organic compound is crude paraffin wax.

5. A composition in accordance with claim 1 in which the aliphatic, non-ionic, organic compound is hydrogenated castor oil.

6. A composition in accordance with claim 1 in which the aliphatic, non-ionic, organic compound is a mixture of crude paraffin wax and hydrogenated castor oil.

References Cited in the file of this patent

UNITED STATES PATENTS

| 2,616,879 | Zoss | Nov. 4, 1952 |
| 2,627,471 | Dowd | Feb. 3, 1953 |
| 2,627,483 | Dowd | Feb. 3, 1953 |
| 2,647,100 | Salditt | July 28, 1953 |

OTHER REFERENCES

Shell, Paint Oil and Chem. Review, Nov. 9, 1950, pages 15-18, 48 and 49.